United States Patent [19]
Betts

[11] 3,726,090
[45] Apr. 10, 1973

[54] SUPPORT AND PRESSURE SEALANT FOR CARPET ROLL TYPE SOLID PROPELLANT GRAIN

[75] Inventor: Robert E. Betts, Huntsville, Ala.

[73] Assignee: The United States of America as represented by the Secretary of the Navy

[22] Filed: June 3, 1971

[21] Appl. No.: 149,433

[52] U.S. Cl. .................60/255, 60/256, 102/100
[51] Int. Cl. ...........................................F02k 9/04
[58] Field of Search....................60/253, 255, 256, 60/263, 39.47, 39.82 E; 102/100, 101

[56] References Cited
UNITED STATES PATENTS

| 3,104,523 | 9/1963 | O'Donnell | 60/255 |
| 3,635,030 | 1/1972 | Schubert et al. | 60/39.47 X |
| 2,974,476 | 3/1961 | Fox | 60/255 |
| 3,196,735 | 7/1965 | Baldwin | 102/101 X |

Primary Examiner—Carlton R. Croyle
Assistant Examiner—Michael Koczo, Jr.
Attorney—Harry M. Saragovitz, Edward J. Kelly, Herbert Berl and James T. Deaton

[57] ABSTRACT

A rocket motor that has a cartridge type propellant with a foam material about the propellant grain to support the propellant grain and provide a pressure sealant until the propellant grain has been ignited.

3 Claims, 1 Drawing Figure

PATENTED APR 10 1973   3,726,090
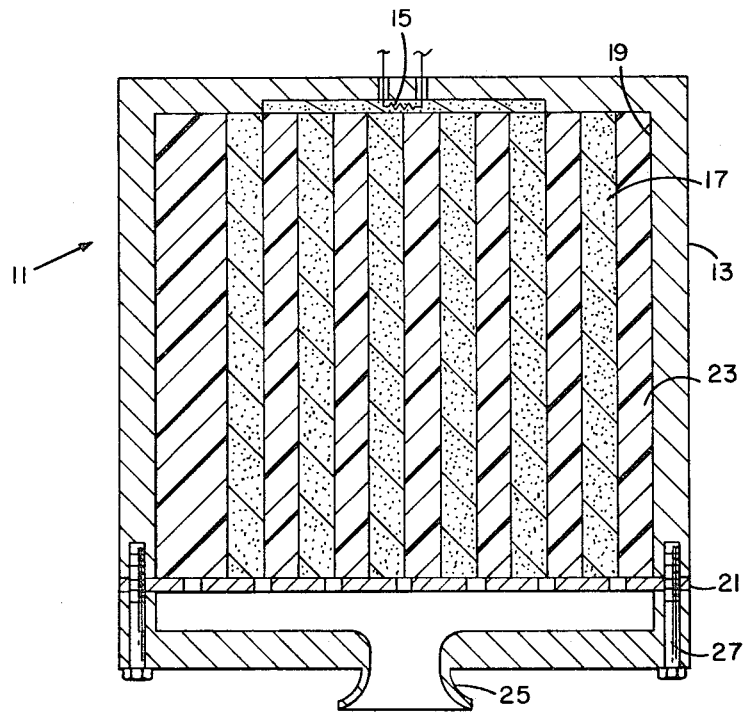
Robert E. Betts,
INVENTOR.
BY *Harry M. Saragovitz*
*Edward J. Kelly*
*Herbert Berl*
*James T. Deaton*

SUPPORT AND PRESSURE SEALANT FOR CARPET ROLL TYPE SOLID PROPELLANT GRAIN

BACKGROUND OF THE INVENTION

A common practice with the use of a cartridge type grain used in rocket motors is to insert the grain into the motor cavity and support it by means of a trap or a suspension mechanism. The ignitor when fired must be designed to pressurize the free volume before equilibrium burning is accomplished. If the ignitor is weak or slow, nozzle closures must be used to enhance ignition. These closures create debris and result in high motor pressure at elevated temperature. The ignition action in motors causes pressure differentials across propellant grains and when using a carpet roll or scroll grain, this differential causes the grain to undergo severe stress (even unrolling) which in turn causes grain break-up and/or uneven burning.

Therefore, it is an object of this invention to provide a device which improves the state of the art of rocket motor ignition and combustion.

Another object of this invention is to provide mechanical strength for rocket motors in general.

Still another object of this invention is to provide mechanical strength to rocket motors that have a carpet roll or scroll grain as the propellant thereof.

A further object of this invention is to provide mechanical strength to rocket motors by supporting the grain of the rocket motor with a foam material that is placed about the propellant grain.

SUMMARY OF THE INVENTION

In accordance with this invention, a rocket motor is provided that has a motor case with an ignitor mounted at the forward end of the motor case, a carpet roll type propellant grain in the intermediate portion of the motor case, a trap or perforated suspension means near the aft end of the motor case, exhaust nozzle at the aft end of the motor case and low density high strength foam material supporting the propellant grain against severe stress and shock of the propellant grain caused by pressure differentials across the propellant grain.

BRIEF DESCRIPTION OF THE DRAWING

The single FIGURE of the drawing is a sectional view through a rocket motor according to this invention.

DETAILED DESCRIPTION OF THE INVENTION

Referring to the drawing, rocket motor 11 includes a motor case 13 with a conventional ignitor 15 at the head end of the motor case. A carpet roll type propellant grain 17 is mounted in chamber 19 of the motor case and is supported by perforated trap or suspension plate 21 and foam material 23. Trap 21 and nozzles 25 are secured to the motor case by conventional means such as bolts 27.

Foam material 23 may be material such as pre-expanded styrofoam beads and/or sheets or may be other foam material such as polyurethane foam. The particular foam material used will depend upon the particular propellant composition of the carpet roll grain 17. That is if water affects the propellant composition once it has been rolled into the carpet roll, some foam material must be used that does not contain water or use water in the forming of the foam material. Basic requirements of the foam material is that it must be light and yet rigid when cured into place. If the foam material used is styrofoam, the styrofoam may be in sheet form and rolled along with the carpet roll propellant and expanded into its final shape after the carpet roll and styrofoam have been placed in the motor case. The styrofoam may also be inserted relative to the carpet roll propellant by sprinkling styrofoam beads into the spaces around and between the convolutes of the carpet roll propellant and then expanding the beads by subjecting them to an atmosphere of steam. This steam expanding of the beads or the sheets of pre-expanded styrofoam are conventional processes. The pre-expanded styrofoam works well with double base type solid propellants. If polyurethane type foam is used, the propellant grain can be placed in the chamber of the motor case and the polyurethane foam can be poured into the void within and around the propellant grain and allowed to foam into place.

In operation, when ignitor 15 is fired, foam 23 collapses in the direction of the gas flow from the ignitor. The surface of carpet roll propellant 17 is increasingly exposed and ignited. This action progresses from the head-end toward the aft end of the rocket motor allowing the propellant to ignite more uniformally. Since the propellant is ignited from head-end to aft end under pseudo closed conditions, no closures are needed to aid ignition. Since foam 23 is always of low density, there is no debris upon ignition. Also, since the volume increases as the foam is expended to expose the available surfaces of carpet roll grain 17, the peak ignition pressures are reduced.

I claim:

1. A rocket motor comprising a motor case having an ignitor mounted at the head end of the motor case, a propellant grain in the form of a carpet roll mounted in a chamber of the motor case adjacent said ignitor, a low density and rigid foam means between convolutes of the carpet roll to support and seal the propellant grain, nozzle exhaust means secured to the motor case at the aft end of the motor case for exhausting gases from said chamber when said propellant grain is ignited and collapses said foam means, and a perforated trap mounted at the aft end of the propellant grain to aid in the support of the propellant grain.

2. A rocket motor as set forth in claim 1, wherein said propellant grain is of the double base type and wherein said foam means is styrofoam.

3. A rocket motor as set forth in claim 1, wherein said propellant grain is of the composite type and said foam means is polyurethane foam.

* * * * *